(12) United States Patent
Kang et al.

(10) Patent No.: US 10,054,759 B2
(45) Date of Patent: Aug. 21, 2018

(54) APPARATUS FOR AUTO FOCUS WITH THREE-LOCATION SUPPORTING STRUCTURE

(71) Applicant: JAHWA electronics Co., Ltd., Chungcheongbuk-do (KR)

(72) Inventors: Il Kyu Kang, Chungcheongbuk-do (KR); Hee Seung Kim, Seoul (KR); In Soo Kim, Gyeonggi-do (KR)

(73) Assignee: JAHWA ELECTRONICS CO., LTD., Chungcheongbuk-Do (KR)

( * ) Notice: Subject to any disclaimer, the term of this patent is extended or adjusted under 35 U.S.C. 154(b) by 180 days.

(21) Appl. No.: 15/191,746

(22) Filed: Jun. 24, 2016

(65) Prior Publication Data

US 2017/0261720 A1 Sep. 14, 2017

(30) Foreign Application Priority Data

Mar. 10, 2016 (KR) ........................ 10-2016-0029137

(51) Int. Cl.
*G02B 7/04* (2006.01)
*G02B 7/09* (2006.01)
*G02B 7/02* (2006.01)
*G02B 27/64* (2006.01)
*G02B 7/10* (2006.01)

(52) U.S. Cl.
CPC .............. *G02B 7/09* (2013.01); *G02B 7/023* (2013.01); *G02B 27/646* (2013.01); *G02B 7/04* (2013.01); *G02B 7/10* (2013.01); *G02B 7/102* (2013.01)

(58) Field of Classification Search
CPC .. G02B 7/023; G02B 7/04; G02B 7/09; G02B 7/10; G02B 7/102
USPC ................................ 359/819, 822, 823, 824
See application file for complete search history.

(56) References Cited

U.S. PATENT DOCUMENTS

| | | | |
|---|---|---|---|
| 9,857,556 B1* | 1/2018 | Kim ...................... | H02K 11/215 |
| 2014/0160311 A1* | 6/2014 | Hwang ................ | G02B 27/646 |
| | | | 348/208.99 |
| 2014/0362284 A1* | 12/2014 | Shin ...................... | G02B 27/646 |
| | | | 348/373 |
| 2015/0049209 A1* | 2/2015 | Hwang .............. | H04N 5/23287 |
| | | | 348/208.11 |
| 2016/0241787 A1* | 8/2016 | Sekimoto ............. | H04N 5/2257 |
| 2017/0052387 A1* | 2/2017 | Yu ............................ | G02B 7/04 |
| 2017/0108660 A1* | 4/2017 | Kuo ......................... | G02B 7/08 |

FOREIGN PATENT DOCUMENTS

| KR | 10-2015-0104703 A | | 9/2015 | |
|---|---|---|---|---|
| KR | WO 2016013708 A1 | * | 1/2016 | ............... G02B 7/04 |

* cited by examiner

*Primary Examiner* — Nicholas R Pasko
(74) *Attorney, Agent, or Firm* — The PL Law Group, PLLC

(57) ABSTRACT

An apparatus for auto focus with a three-location supporting structure includes a first frame having a magnet; a second frame having an AF coil, configured to move the first frame in an optic-axial direction; and a plurality of balls located between the first frame and the second frame to maintain a spaced state of the first frame and the second frame, wherein among the plurality of balls, three balls have a greater size than the other balls.

8 Claims, 5 Drawing Sheets

FIG. 1

PRIOR ART

FIG. 2

PRIOR ART

APPARATUS FOR AUTO FOCUS WITH THREE-LOCATION SUPPORTING STRUCTURE

CROSS-REFERENCE TO RELATED APPLICATION AND CLAIM OF PRIORITY

The present application claims priority to Korean Patent Application No. 10-2016-0029137 filed in the Republic of Korea on Mar. 10, 2016, the disclosures of which are incorporated herein by reference.

BACKGROUND

1. Technical Field

The present disclosure relates to an apparatus for auto focus for a camera module, and more particularly, to an apparatus for auto focus with a three-location supporting structure, which has an improved ball supporting structure for the movement in an optical direction.

2. Background Art

Along with the development of hardware technique for image processing and the increase of user needs for image photographing, an auto focus (AF) function, an optical image stabilization (OIS) function or the like is implemented in a camera module mounted to a mobile terminal such as a cellular phone and a smart phone as well as a camera.

The auto focus (automatic focusing) function adjusts a focal distance to a subject by linearly moving a lens or an assembly having the lens in an optic-axial direction so that a clear image is generated at an image sensor (CMOS, CCD or the like) provided at a rear end of the lens.

In order to implement the auto focus function, various methods are used. Representatively, a magnet (a permanent magnet) is installed at an AF carrier (or, a moving body), a coil is installed at a fixed body (a housing, or another-type carrier or the like), and a power of a suitable intensity is applied to the coil to generate an electromagnetic force at the coil (provided at the fixed body) and the magnet (provided at the moving body) so that the moving body moves in an optic-axial direction.

In addition, a device or actuator in which the AF and OIS functions are integrated has been recently used. In this case, a structure for moving an OIS carrier (or, a frame, a lens assembly or the like) having a lens loaded therein within the AF carrier in a direction perpendicular to the optic-axial direction is integrally implemented together with the AF structure described above. As another implementation, a lens may be located at the AF carrier, and an OIS carrier provided out of the AF carrier may move in a direction perpendicular to the optic-axial direction.

Figure 1:
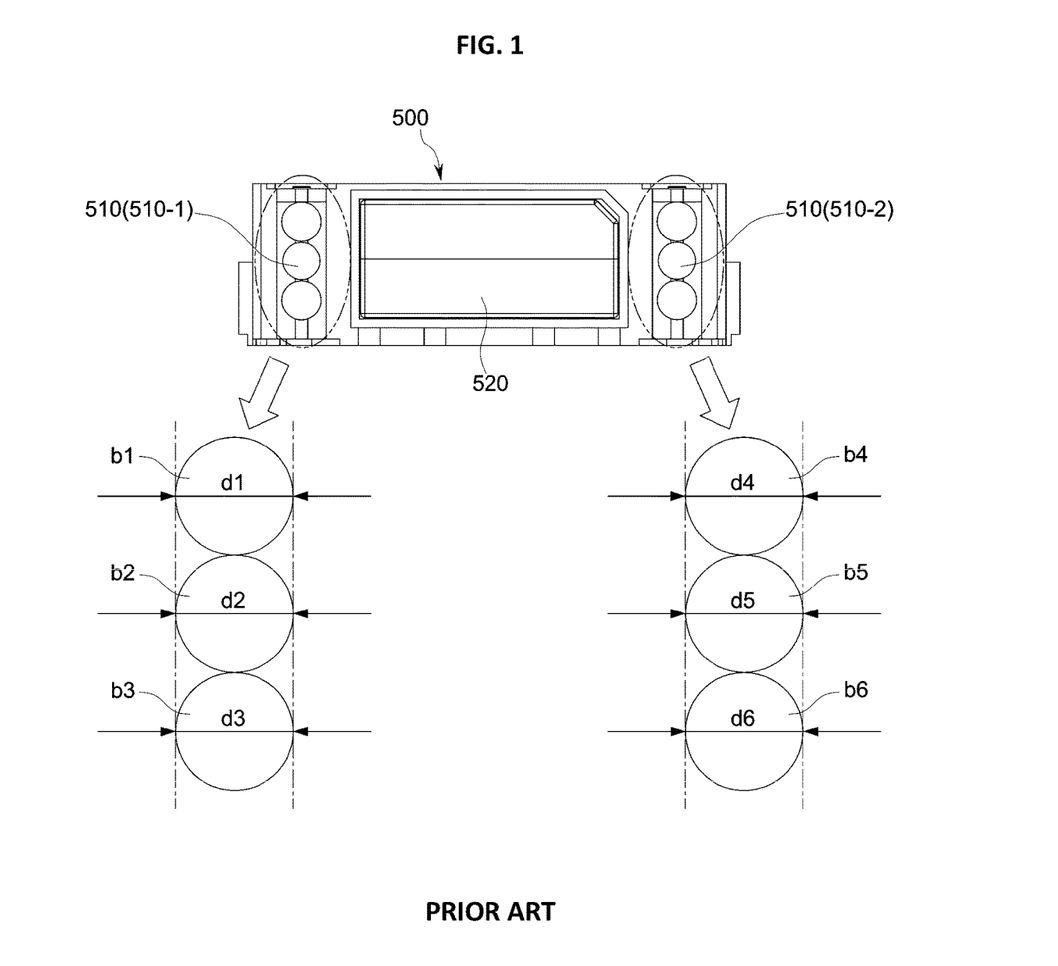
FIG. 1 is a diagram showing a structure for existing AF operation.

Meanwhile, in an existing device where only the AF function is implemented or the AF and OIS functions are implemented together, as shown in FIG. 1, balls 510-1, 510-2 arranged in the same direction as an optical axis are interposed between an AF carrier (a moving body) 500 and a housing (a fixed body) (not shown) in order to improve the behavior characteristic of the AF carrier 500 moving in the optic-axial direction.

In this structure, a suitable distance between the moving body and the fixed body may be consistently maintained, and a friction is minimized by means of rotating motions of the balls and point contact of the balls, so that the AF carrier may move in the optic-axial direction more flexibly and more accurately.

In the existing technique, a plurality of balls b1 to b6 having the same size (diameter) d1 to d6 are used, or balls having the same size are used but four balls having a greater size are disposed outer sides so that the four balls give a support. In this case, theoretically, all balls (or, four balls) make point contact simultaneously so that the horizontal direction of the AF carrier is maintained in operation. However, actually, the balls do not make point contact simultaneously, and thus a fault occurs at the horizontal tilt of the AF carrier.

In detail, first, sizes of balls cannot be physically perfectly identical, and thus ideal sameness cannot be implemented. Thus, since contacts are complexly made by a plurality of objects in this structure, rather than by a single object, a physical gap may occur, which generates a resultant tilt fault.

In addition, since the AF carrier is not always fixed but repeats moving in an optic-axial direction and stopping, static frictions and kinetic frictions of differential intensities are generated, and such differential frictions cause a gap. Thus, it is actually impossible for all balls to make point contact simultaneously, and thus a tilt fault of the AF carrier 의 tilt fault occurs.

Further, even though a ball is adhered to one side of the AF carrier due to an attractive force generated between the magnet of the AF carrier and the yoke provided at the fixed body, the AF carrier extending in a horizontal direction is more influenced by gravity at a region farther from the side adhered to the ball, namely as the degree of extension increases. This also makes it impossible that all balls make point contact simultaneously. As a result, the above factors are complexly applied to generate a tilt fault of the AF carrier.

Figure 2:
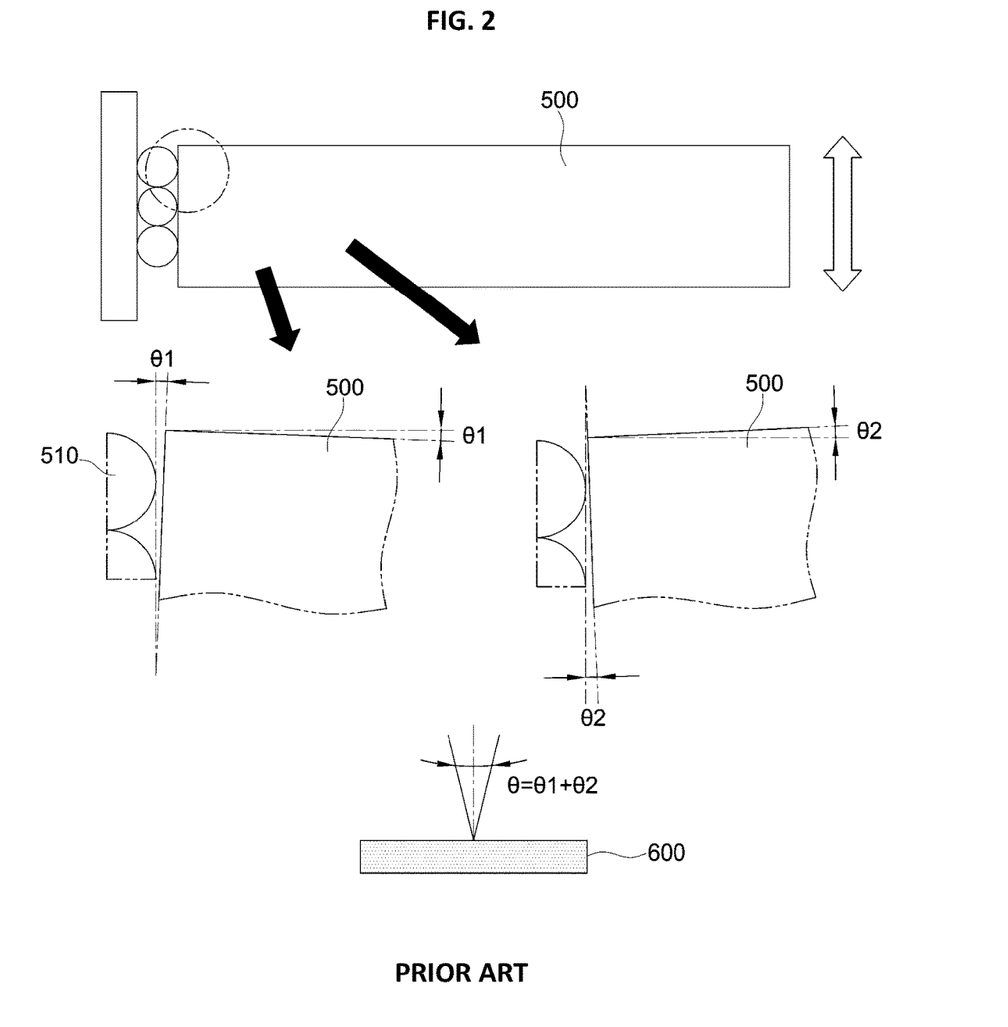
FIG. 2 is a diagram for schematically illustrating a tilt fault occurring at the existing AF operation.

In the existing technique, a plurality of balls are simply disposed without any consideration of the above problems. Thus, due to the above problems, in an existing device, when an AF carrier 500 moves in an optic-axial direction, balls making point contact with the AF carrier are frequently changed, and such frequent change of balls making point contact resultantly collapses the balance of the AF carrier 500, thereby causing tilt faults θ1 and θ2 of the AF carrier 500.

Such tilt faults deform a path of light introduced into an image sensor 600 through a lens as much as a maximum separation angle (θ=θ1+θ2), which causes an error in focus adjustment as much and accordingly causes problems in generating a clear image. Recently, a camera module loaded in a smart phone or the like is implemented with a light and slim design. In this slim design, a ratio of thickness to width of the AF carrier becomes greater, and thus the tilt problem of the AF carrier as above becomes worse.

SUMMARY

The present disclosure is designed to solve the problems of the related art, and therefore the present disclosure is directed to configuring a moving body and a fixed body for an AF operation to be physically supported by each other by means of three balls to fundamentally preventing contact points from being changed, deviated or spaced, thereby implementing an apparatus for auto focus with more reliability.

Other objects and advantages of the present disclosure will be understood from the following description and become more apparent by embodiments of the present disclosure. In addition, it could be easily understood that the objects and advantages of the present disclosure can be implemented by components defined in the claims or their combinations.

In one aspect of the present disclosure, there is provided an apparatus for auto focus with a three-location supporting structure, comprising: a first frame having a magnet; a second frame having an auto focus (AF) coil, configured to move the first frame in an optic-axial direction; and a plurality of balls located between the first frame and the second frame to maintain a spaced state of the first frame and the second frame, wherein among the plurality of balls, three balls have a greater size than the other balls. Here, the three balls having a greater size than the other balls may have the same size.

In addition, the plurality of balls of the present disclosure may include: a first ball group composed of an n (n is a natural number of 3 or above) number of balls arranged together along the optic-axial direction; and a second ball group composed of an m (m is a natural number of 3 or above) number of balls provided at locations different from the first ball group and arranged together along the optic-axial direction, wherein two balls belonging to any one of the first ball group and second ball group have a greater size than the other balls included in the corresponding group, and one ball belonging to the other group has a greater size than the other balls included in the corresponding group.

In this case, the two balls having a greater size than the other balls included in the corresponding group and the one ball having a greater size than the other balls included in the corresponding group may have the same size.

In order to implement more preferred embodiment, the first frame of the present disclosure may have first and second guide grooves extending along the optic-axial direction, and the second frame may have first and second receiving grooves formed to face the first and second guide grooves, respectively. In this case, the first ball group may be located between the first guide groove and the first receiving groove, and the second ball group may be located between the second guide groove and the second receiving groove.

In addition, the first and second ball group of the present disclosure may include an odd number of balls. Also, the two balls having a greater size than the other balls included in the corresponding group may be located at both ends among the balls belonging to the corresponding group, and the one ball having a greater size than the other balls included in the corresponding group may not be located at both ends among the balls belonging to the corresponding group.

Further, the first guide groove and the second guide groove may have different sectional shapes. In this case, any one of the first and second guide grooves may have a V-shaped section, and the other of the first and second guide grooves may have a U-shaped section. Here, the two balls having a greater size than the other balls included in the corresponding group may be provided at the guide groove having a V-shaped section, among the first and second guide grooves.

According to a preferred embodiment of the present disclosure, since a frame for AF (an AF carrier) is configured to make point contact at only three balls so that the point contact of the frame is perfectly maintained, thereby fundamentally preventing a tilt fault of the AF carrier (the frame).

Further, according to the embodiment of the present disclosure, even though the AF frame (an AF carrier or the like) repeats moving in an optic-axial direction and stopping for auto focusing, the AF frame may always maintain its horizontal state without being spaced or separated from the balls, thereby implementing a focusing function with more reliability.

In addition, the present disclosure may give an effect more optimized for recent product and technology trends, which is more sensitive to a slight tilt change of the AF carrier due to slimmer components and higher pixel quality.

DETAILED DESCRIPTION

Other objects, features and advantages of the present invention will become apparent from the following descriptions of the embodiments with reference to the accompanying drawings, from which it will be deemed that a person having ordinary skill can easily practice the technical spirit of the present invention. Also, any explanation of the prior art known to relate to the present invention may be omitted if it is regarded to render the subject matter of the present invention vague. Hereinafter, preferred embodiments of the present invention will be described in detail with reference to the accompanying drawings.

An apparatus 100 for auto focus with a three-location supporting structure according to the present disclosure (hereinafter, also referred to as an 'apparatus for auto focus') linearly moves an AF carrier having a lens forward or backward in an optic-axial direction (Z-axis direction) by means of an electromagnetic force generated between a coil and a magnet as shown in the figures to accurately harmonize a focal distance to a subject so that a clearer image of the subject is generated. Depending on embodiments, the present disclosure may be implemented in both a device having only such an AF function and a device at which the AF function and the OIS function are integrally applied.

Figure 3:
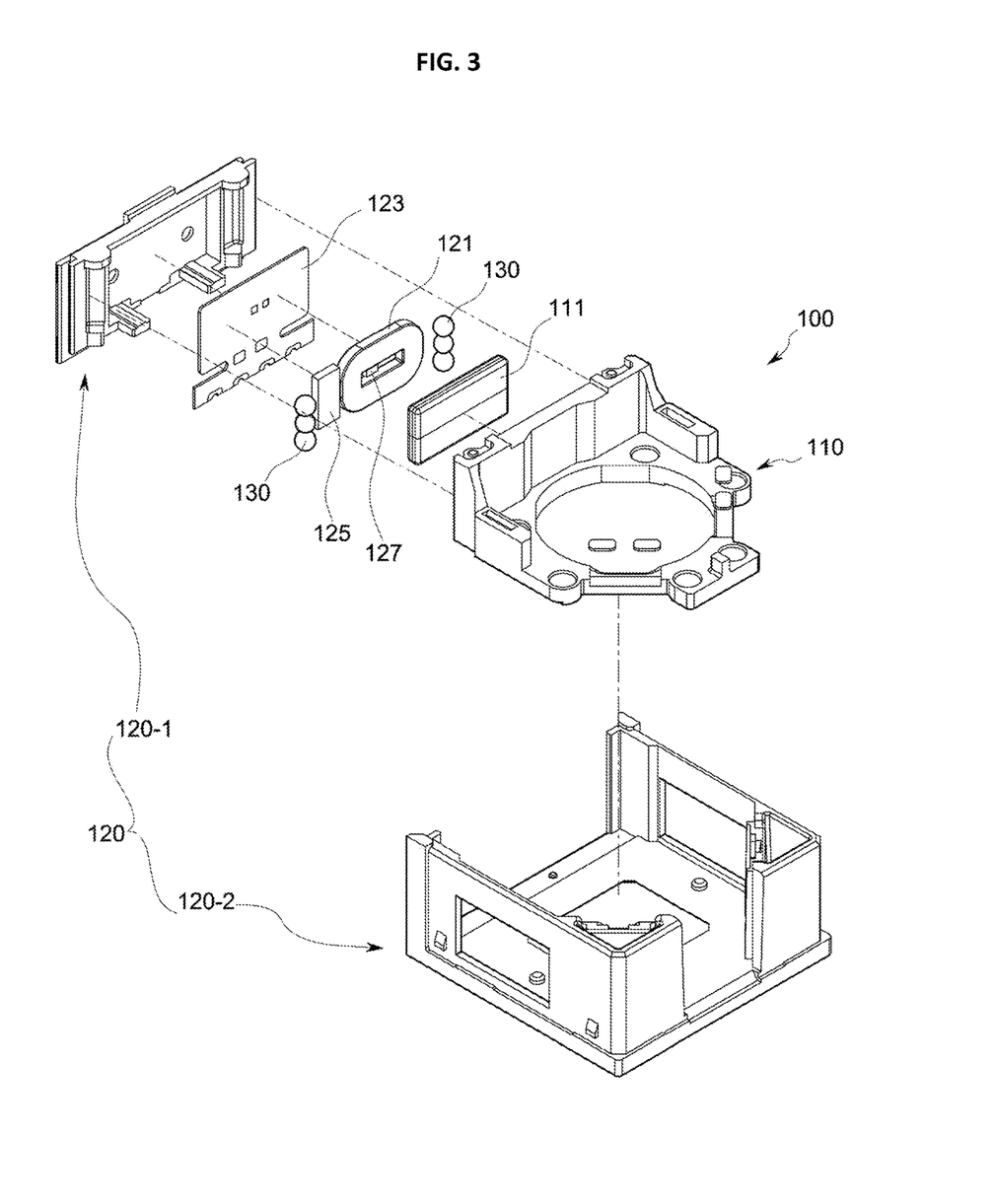
FIG. 3 is an exploded view showing an apparatus for auto focus with a three-location supporting structure according to a preferred embodiment of the present disclosure.

FIG. 3 is an exploded view showing an auto focus apparatus 100 according to a preferred embodiment of the present disclosure.

As shown in FIG. 3, the auto focus apparatus 100 according to a preferred embodiment of the present disclosure may include a first frame 110, a second frame 120 and a plurality of balls 130.

The first frame 110 may further include a magnet 111, and a back yoke (not shown) may be further installed at a rear side of the magnet 111 to focus a magnetic force. The first frame 110 corresponds to a moving body for AF operation, and the AF carrier described above may serve as the first frame 110.

In a device where the AF function is implemented solely, a lens (not shown) is loaded at the first frame 110 to physically move together with the first frame 110. Thus, as the first frame 110 moves in an optic-axial direction, the lens also moves in the optic-axial direction, and by this movement, a distance to the image sensor is adjusted to implement auto focusing.

In an embodiment where the AF function and the OIS function are integrated, an OIS frame (carrier) for OIS operation may be further provided at the first frame 110, for the movement in X-axis and Y-axis directions perpendicular to the optic-axial direction (Z).

In an embodiment, if a lens (or, a lens assembly) is loaded at the OIS frame (not shown) and the first frame 110 moves in an optic-axial direction, the OIS frame moves in the optic-axial direction together, and thus the lens also moves in the optic-axial direction. If the OIS operation is performed for optical image stabilization, the OIS frame moves in a direction perpendicular to the optic-axial direction above the first frame to compensate movement caused by hand tremors.

The second frame 120 of the present disclosure is a counterpart component of the first frame 110. Here, if the first frame 110 is a moving body for AF operation, the second frame 120 corresponds to a fixed body in a relative point of view.

The second frame 120 may include an AF coil 121, a FPCB 123, a drive chip 125 and a hall sensor 127. The AF coil 121 generates an electromagnetic force corresponding to intensity and direction of power applied from the outside so that the first frame 110 having the magnet 111 moves in an optic-axial direction.

The hall sensor 127 senses a location of the magnet 111 (a location of the first frame, namely a location of the lens) by means of a hall effect and transmits a corresponding signal to the drive chip 125 of the present disclosure, and the drive chip 125 controls to apply a power of suitable intensity and direction to the AF coil 121, by using the signal of the hall sensor. By feeding back an accurate location of the lens on the basis of the optic-axial direction in this way, the auto focus function is implemented. The AF coil 121, the drive chip 125 and the hall sensor 127 are loaded on the FPCB 123 connected to an external module, a power source, a device or the like.

The second frame 120 may be separated into a second sub frame 120-1 and a second main frame 120-2 as shown in FIG. 3, or may also be implemented as a single integrated object.

As shown in FIG. 3, a plurality of balls 130 are located between the first frame 110 and the second frame 120 (the second sub frame 120-10), and by means of the plurality of balls 130, the first frame 110 and the second frame 120 keep spaced apart from each other as much as the diameter of the balls. To keep the first frame 110 and the second frame 120 spaced apart by means of the balls, a yoke may be further provided at the second frame 120 to generate an attractive force to the magnet 111 of the first frame 110.

As described above, even though the plurality of balls 130 are designed to make point contact with both the first frame 110 and the second frame 120, the balls cannot make point contact simultaneously at four or more points, unless it is an ideal case. Also, point contact is made variably at three locations, which frequently changes contact points, and such frequently changed contact points cause a tilt fault of the first frame 110.

The present disclosure is based on the recognition of this problem and is directed to solving this problem. In the present disclosure, the plurality of balls 130 are disposed between the first frame 110 and the second frame 120, and among the plurality of balls 130, only three balls are configured to have a greater size than other balls.

If three balls have a greater size (diameter) than other balls as above, point contact made by the three balls may be consistently maintained, and thus it is possible to fundamentally solve the problem that balls making point contact are frequently changed to cause a tilt by gaps or intervals.

The relatively larger three balls and other balls may have various sizes depending on its embodiment. However, if the three balls having a relatively greater size (diameter) are too large in comparison to other balls, contact between balls may disturb rotation of the balls. Thus, the balls may be formed with various sizes which do not disturb rotation of the balls. In this regard, the balls having a greater size may have a size in the range of 105% to 120% of the size of the smaller balls. Meanwhile, absolute sizes of the balls may be variously selected depending on the size of a device or the like.

If a portion of the first frame 110 coming into contact with the three balls (hereinafter, referred to as 'large-diameter balls') having a greater size than other balls is modified to have a shape, form, step or the like corresponding to size and location of the individual large-diameter balls, the first frame 110 may be configured to have horizontality. Thus, even though it is not demanded that all of the large-diameter balls have the same size, it is desirable that the large-diameter balls have the same size for simpler and more precise implementation.

In this regard, the other balls (hereinafter, referred to as small-diameter balls) having a smaller size than the large-diameter balls are also not demanded to have the same size, but it is desirable that they have the same size in order to more effectively implement operation characteristics in consideration of rotation of balls and contact to adjacent balls.

Figure 4:
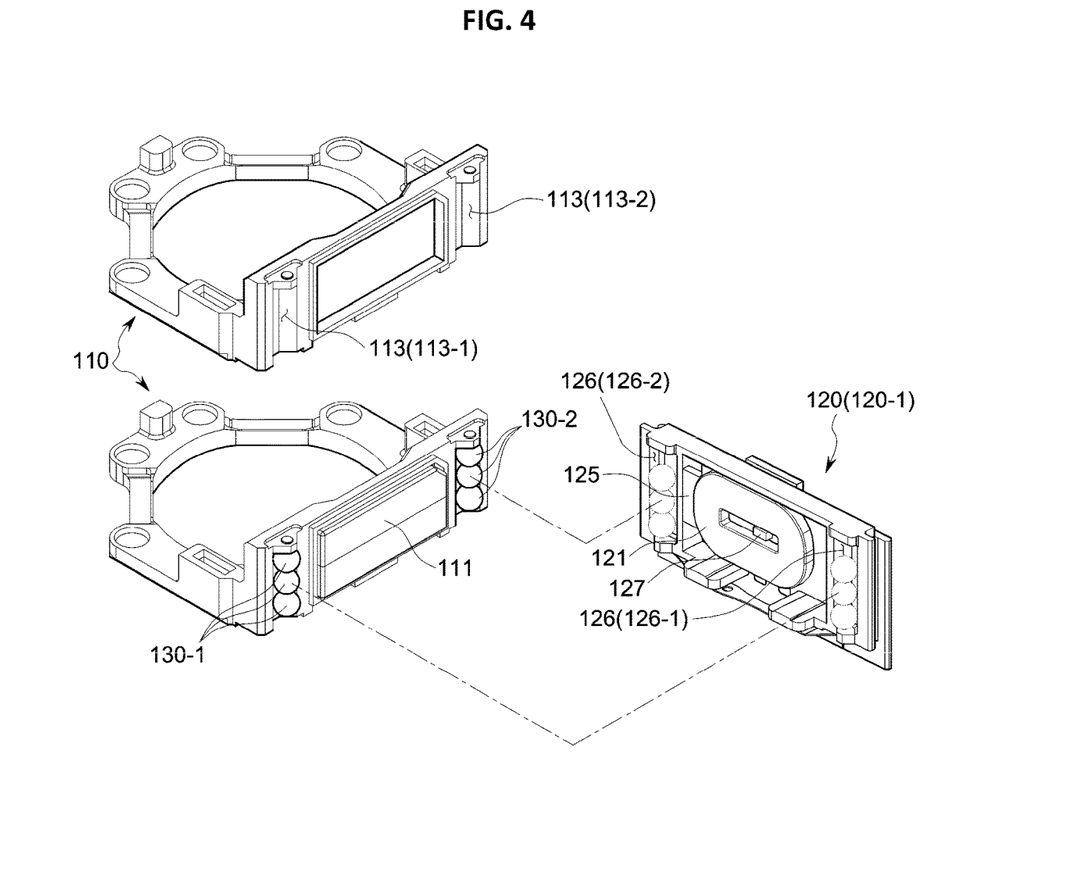
FIG. 4 is a diagram showing a detailed configuration of a first frame and a second frame of the present disclosure, depicted in FIG. 3.

FIG. 4 is a diagram showing a detailed configuration of the first frame 110 and the second frame 120 according to the present disclosure.

As described above, the first frame 110 of the present disclosure moves forward and backward along the optic-axial direction. Thus, in order to effectively guide such movement in the optic-axial direction, as shown in FIGS. 3 and 4, the plurality of balls 130 of the present disclosure may be arranged along the optic-axial direction (the Z-axis direction).

Further, the plurality of balls 130 may be classified into a first ball group 130-1 composed of n number of balls arranged together along the optic-axial direction and a second ball group 130-2 provided at a location different from the first ball group 130-1 and composed of m number of balls arranged together along the optic-axial direction so that the first frame 110 may be physically supported more stably by the point contact. "n" and "m" are a natural number of 3 or above, and n and m be numbers identical to each other or different from each other.

In this case, two balls belonging to the first ball group 130-1 have a greater size than other balls belonging to the first ball group 130-1, and one ball belonging to the second ball group 130-2 has a greater size than other balls belonging to the second ball group 130-2, thereby realizing three-location supporting.

In a similar way, if two balls belonging to the second ball group 130-2 have a greater size than other balls belonging to the second ball group 130-2, one ball belonging to the first ball group 130-1 has a greater size than other balls belonging to the first ball group 130-1.

In other words, in the present disclosure, two balls belonging to any one of the first ball group 130-1 and second ball group 130-2 may have a greater size than other balls belonging to the corresponding group, and one ball belonging to the other group may have a greater size than other balls belonging to the other group, thereby realizing three-location supporting.

In this case, the two balls having a greater size than other balls belonging to the corresponding group and the one ball having a greater size than other balls belonging to the corresponding group may have the same size.

In addition, a guide groove 113 extending along the optic-axial direction may be provided at the first frame 110 to prevent the plurality of balls 130 from being deviated outwards and also guide the movement of first frame 110 in the optic-axial direction more effectively. As in the embodiment depicted in FIG. 4, the guide groove 113 may include a first guide groove 113-1 located at a left side in FIG. 4 and a second guide groove 113-2 located at a right side.

The second frame 120 includes a receiving groove 126 corresponding to the structure of the guide groove 113 of the first frame 110. Here, the receiving groove 126 may include a first receiving groove 126-1 corresponding to the first guide groove 113-1 of the first frame 110 and a second receiving groove 126-2 corresponding to the second guide groove 113-2 of the first frame 110, namely disposed at a location facing the second guide groove 113-2.

In this case, the first ball group 130-1 described above may be provided to be partially accommodated between the first guide groove 113-1 and the first receiving groove 126-1, and the second ball group 130-2 may be provided to be partially accommodated between the second guide groove 113-2 and the second receiving groove 126-2.

Since the ball 130 rotates in point contact with adjacent another ball, the first ball group 130-1 and the second ball group 130-2 may respectively include an odd number of balls so that balls having a greater diameter may rotate in the same direction.

Figure 5:
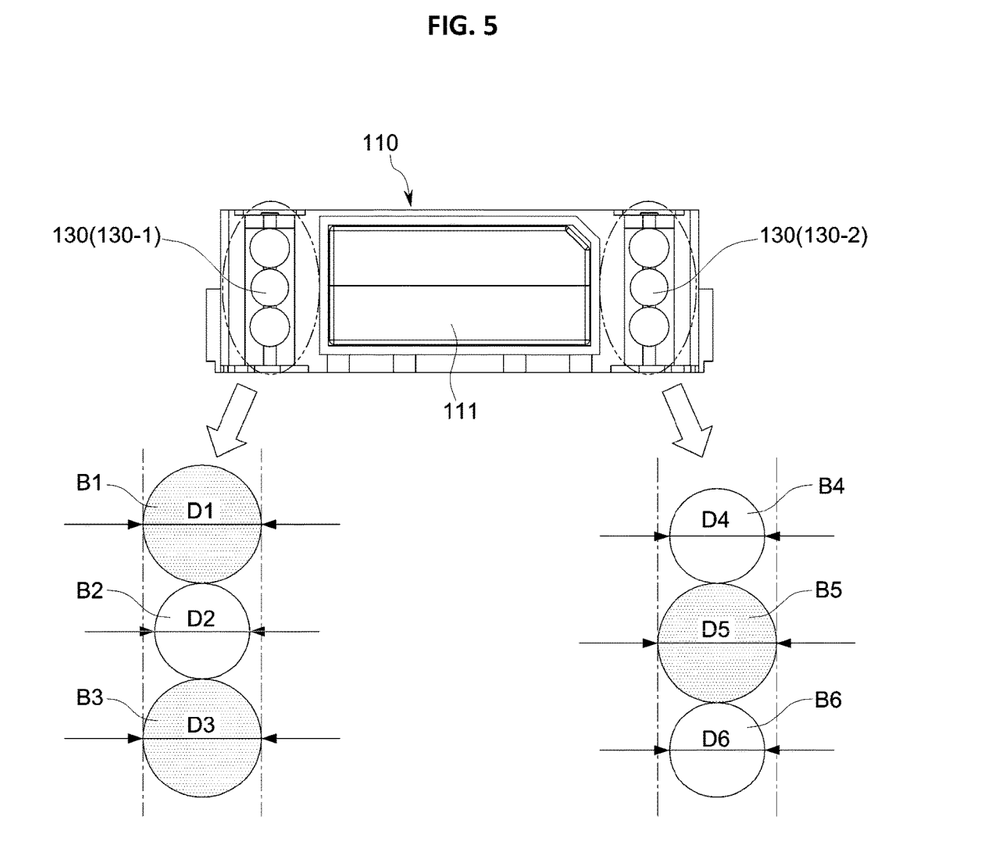
FIG. 5 is a diagram showing a preferred embodiment of balls of the present disclosure.

In addition, more preferably, as shown in FIG. 5, the two balls B1, B3 belonging to the first ball group 130-1 and having greater sizes D1, D3 than other balls belonging to the same group are located at both ends of the first ball group 130-1, and the one ball B5 belonging to the second ball group 130-2 and having a greater size D5 than other balls belonging to the same group is at a location other than both ends of the second ball group 130-2, preferably a center location, to further increase a support region for physical support.

If five balls are respectively provided, two balls having a greater size than other balls belonging to the same group may be provided at any locations of five balls, but they are located symmetrically to effectively implement horizontal support, preferably as far from the center as possible.

In this point of view, one ball having a greater size than other balls belonging to the same group may be provided at any location in the corresponding ball group, but this ball may be preferably located at a center portion to enhance efficiency of horizontal support.

Meanwhile, any one guide groove of the first guide groove 113-1 and second guide groove 113-2 may have a section of "V" shape, and the other guide groove may have a section of "U" shape.

If both guide grooves have different shapes as above, contact portions to balls and rotating characteristics may be differently set, which may further improve the operation characteristic of the first frame 110 moving in the optic-axial direction.

In this case, one group of the first ball group and the second ball group, which includes two balls having a greater size than other balls belonging to the corresponding group, may be provided to any one guide groove of the first guide groove 113-1 and the second guide groove 113-2, which has a V-shaped section, so that movement caused by rotation of the balls is suppressed to the minimum to improve the tilt characteristic of the first frame 110.

Meanwhile, if the guide groove has a V shape, the ball 130 makes point contact at two points of the V-shaped guide groove. Here, if a guide wall for preventing the ball from being deviated is provided so that the guide groove has a planar bottom surface, the ball 130 makes point contact at three points.

If there is an additional configuration for preventing the ball from being deviated, the portion of the first frame 110 and second frame 120 facing the ball may be formed as a plane, and thus in this case, the ball 130 makes contact with the first frame 110 or the second frame 120 at one point.

In this consideration, if the first and second guide grooves 113-1, 113-2 are provided at the first frame 110 to prevent the ball from being deviated, the receiving groove 126 may not be formed at the second frame 120. In a similar view, if the second frame 120 has the first and second receiving grooves 126-1, 126-2, the guide groove 113 may not be formed at the first frame 110. In addition, it is also possible that the first frame 110 has only the first guide groove 113-1 and the second frame has only the second receiving groove 126-2.

The present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

What is claimed is:

1. An apparatus for auto focus with a three-location supporting structure, comprising:
   a first frame having a magnet and a lens that moves in an optical axis direction for auto focusing;
   a second frame having an auto focus (AF) coil that generates an electromagnetic force to the magnet to move the first frame in an optical axis direction; and
   a plurality of balls located between the first frame and the second frame to maintain a spaced state of the first frame and the second frame,
   wherein the plurality of balls includes,
   a first ball group comprised of three or more balls arranged together along the optical axis direction; and
   a second ball group comprised of three or more balls provided at locations different from the first ball group and arranged together along the optical axis direction,
   wherein two balls belonging to any one of the first ball group and the second ball group have a greater size than other balls included in the corresponding group, and one ball belonging to the other group has a greater size than other balls included in the corresponding group.

2. The apparatus for auto focus with a three-location supporting structure according to claim 1, wherein the three balls having a greater size than other balls have the same size.

3. The apparatus for auto focus with a three-location supporting structure according to claim 1, wherein the two balls having a greater size than other balls included in the corresponding group and the one ball having a greater size than other balls included in the corresponding group have the same size.

4. The apparatus for auto focus with a three-location supporting structure according to claim 1, wherein the first and second ball group includes an odd number of balls; and
   the two balls having a greater size than other balls included in the corresponding group are balls located at both ends among the balls belonging to the corresponding group, and the one ball having a greater size than other balls included in the corresponding group is a ball not located at both ends among the balls belonging to the corresponding group.

5. The apparatus for auto focus with a three-location supporting structure according to claim 1, wherein the first frame has first and second guide grooves extending along the optical axis direction;

the second frame has first and second receiving grooves formed to face the first and second guide grooves, respectively; and the first ball group is located between the first guide groove and the first receiving groove, and the second ball group is located between the second guide groove and the second receiving groove.

6. The apparatus for auto focus with a three-location supporting structure according to claim 5, wherein the first guide groove and the second guide groove have different sectional shapes.

7. The apparatus for auto focus with a three-location supporting structure according to claim 6, wherein any one of the first and second guide grooves has a V-shaped section, the other of the first and second guide grooves has a U-shaped section.

8. The apparatus for auto focus with a three-location supporting structure according to claim 7, wherein the two balls having a greater size than other balls included in the corresponding group are provided at the guide groove having a V-shaped section, among the first and second guide grooves.

* * * * *